Jan. 26, 1960    E. L. SANDBURG    2,922,245
FISHING LURE
Filed July 23, 1956

INVENTOR
EUGENE L. SANDBURG

BY *(signature)*

ATTORNEY

United States Patent Office 2,922,245
Patented Jan. 26, 1960

2,922,245
FISHING LURE

Eugene L. Sandburg, Minneapolis, Minn.

Application July 23, 1956, Serial No. 599,417

8 Claims. (Cl. 43—42.06)

This invention relates to a fishing lure having a tubular body portion with longitudinally extending side fins approximately midway between the front and rear ends of the lure.

A feature resides in forming a tubular hollow body into a more or less tubular shape at the forward end and wherein the tubular body is flattened out to provide longitudinally extending side fins while the rear end thereof extends in a more or less flat formation to provide a bifurcated tail-like portion to the lure. The apexes of the bifurcated tail end of the lure are adapted to freely support fishing hooks which are dragged along behind the lure and spaced apart so as to be positioned at either side of the rear of the lure.

It is also a feature to provide a fishing lure including a tubular body portion at the forward end thereof with beads simulating eyes mounted in the sides of the tubular body. The beads which form the eye portions of the lure may be mounted in a manner so that the friction of the water will cause the beads to rotate, thereby adding an attractive feature to the fishing lure.

A further feature resides in providing a fishing lure having an arcuated body portion, the forward end of which is tubular and open at the frontal extremity thereof to permit the water to flow through the lure causing agitation thereof and providing a transversely disposed tail end which is adapted to support fishing hooks.

The fishing lure may be formed with a sway-back like formation, the end of which is tubular in nature and a pair of rotatable eye-like members supported in either side of the tubular portion and the body of the lure being formed with longitudinally and horizontally disposed side fins to the rear of the tubular frontal portion and a bifurcated horizontally disposed tail portion adapted to support hook means. When the fishing lure is formed in this manner and it is pulled through the water it will set up a turbulence of the water to such an extent as to make the fishing hooks of the lure less visible to the fish.

A further feature of my fishing lure resides in a hollow tubular form at the forward end, while the central and rear portions of the lure are flattened to provide hydrostatic stabilizing elements medially between the ends thereof. Hooks are attached to the aftermost horizontally disposed stabilizing elements. The forward tubular portion is provided with eye members inserted on either side in openings in the tubular portion. The beaded eyes are adapted to create an additional turbulence with that of the water passing through the hollow lure. An opening for receiving a fishing line is formed in the extreme forward end of the hollow tubular portion.

The body of my fishing lure may be formed by stamping the same from flat sheet material. After the sheet material is stamped out into the form desired, the forward portion of the lure is formed tubular and a hole is placed in the forward edge for a fishing line. The rear portion of the fishing lure, directly back of the tubular portion is left approximately flat to provide horizontally disposed medially positioned stabilizing fins while the tail portion of the lure is bifurcated to form horizontal stabilizing end fins. To the end fins of the tail of the lure I provide fish hooks which are pulled through the water by the lure and will extend away from the body of the lure.

The turbulence created by the passage of water through the open front end and past the eye-like members, in combination with the effect created by the fins 11 and 12, cause the aftermost portion of the fishing lure to move from side to side as it is drawn through the water. This creates a wriggle effect which tends to attract the fish to the lure. Also, as the aftermost portion of the lure moves from side to side the fish hooks will tend to be disposed parallel to each other, at an angle away from the direction of movement of the tail portion. Then as the tail portion moves to the opposite direction the hooks also will tend to be disposed in a direction opposite to the movement of the tail of the lure.

The foregoing objects and features will be more clearly hereinafter defined.

In the drawings forming part of the specification;

Figure 1:
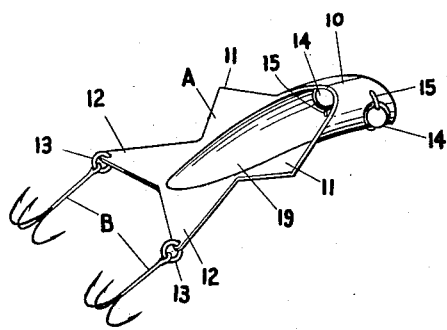
Figure 1 is a perspective view of my fishing lure which is the approximate position that the lure will assume in being drawn through the water.
Figure 2:
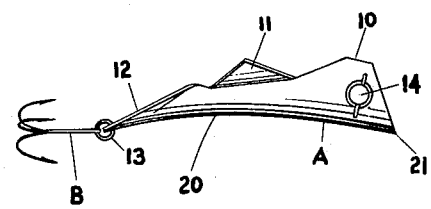
Figure 2 is a side view of Figure 1.
Figure 3:
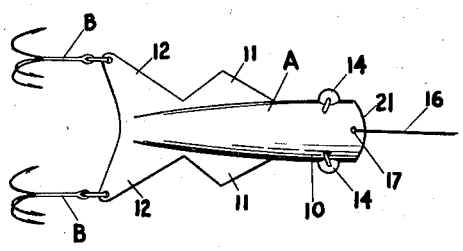
Figure 3 is a bottom view of the lure illustrated in Figure 1.

My fish lure A is designed with a frontal body portion 10. In this form the portion of the body directly back of the tubular portion 10 is adapted to be formed with horizontally disposed side fins 11 which are formed by cutting away the tubular body and flattening the portion which forms the horizontal fins 11 to a certain degree, so as to cause the medially disposed fins 11 to extend out from the sides of the lure A.

The rear end of the lure A is bifurcated to provide the horizontally disposed fins 12 which extend directly back of the fins 11. The fins 12 may carry fish hooks B freely by the rings 13 attached to the apex or ends of the fins 12.

The lure A also is provided with beaded eye members 14 which are rotatably supported on the wires 15 on either side of the tubular front portion of the lure A. The eyes 14 may be of any suitable character and preferably are of a nature to give a sparkling effect as they rotate in the water.

When the lure A is in the water, it is adapted to be drawn by a fish line 16 which is secured through the opening 17 in the front of the tubular portion 10. As the lure A is drawn through the water, it causes a turbulence of the water passing through the hollow tubular front end 10. The eyes 14 also cause a turbulence in the water which tends to disguise the fish hooks B.

The lure A may be formed of any suitable material and colored as may be desired or may be chrome or nickel plated to give a greater effect in the water. Furthermore, the lure A may be formed of aluminum and the body of the lure with its fins anodized in different colors as may be desired. In this manner I provide a very attractive lure.

A further and outstanding feature of my fish lure A resides in the shape of the same with its hollow tubular forward body portion while the horizontal fins 11 and the horizontally disposed tail fins 12 tend to hold the lure in a certain balanced position as it passes through the water. The bifurcated portion of the tail fins 12 space the fish hooks B apart so that they will drag along on either side of the lure behind the same and the turbulence of the water caused by the passing of the lure through the same sets up a disguise around the fish hooks.

Figure 4:
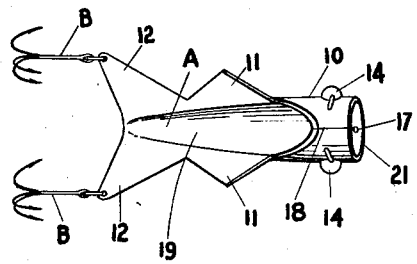
Figure 4 is a top view of the lure illustrated in Figure 1.
Figure 5:
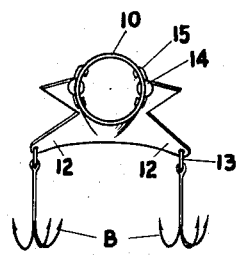
Figure 5 illustrates a front view of the lure illustrated in the foregoing figures.

The fish lure A may be died out of flat sheet material and when the same is formed in this manner, a dividing line 18 would be apparent in the tubular end 10 as illustrated in Figure 4. In other respects the lure will appear the same.

When the fish lure A is died out from flat sheet material the forward end 10 is formed tubular while the medial fins 11 are shaped to extend horizontally with the longitudinally depressed curved inner surface 19, as illustrated in Figures 1 and 4. The depressed inner curved longitudinally extending surface 19 extends in a gentle curve from the tubular portion 10 to the center of the tail portion or fins 12.

In forming and shaping the fish lure A, as indicated in the drawing, the under outer surface 20 complemental with the inner depressed surface 19 is designed to extend in long easy curves from the apex 21 of the lure to the tail portion thereof. The curve 20 can be varied from the apex 21 to the tail fins 12, either to a long gentle curve or a virtually straight line from end to end of the fish lure.

I have illustrated my fish lure in the foregoing drawings to indicate the substantial formation thereof and such variations as are shown and I desire to have the invention herein contained interpreted within the scope of the following claims.

Figure 7:
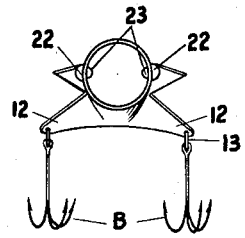
Figure 7 illustrates a forward view of my lure wherein the beaded eyes are shown placed into openings in the side of the tubular body of the lure to hold the eyes in place by frictional engagement with the body.
Figure 6:
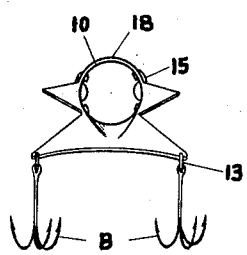
Figure 6 illustrates a rear view of the lure in the foregoing figures.

An alternate method of inserting the eye-like members into the fishing lure is illustrated in Figure 7. The rounded eye-like members 22 may be formed with a reduced inner portion 23 which is insertable into a hole in the body of the fishing lure. Outwardly of the reduced inner portion 23 is a further reduced section of the member. The eye-like members 23 may be forced into openings in the fishing lure which are of slightly lesser diameter than the reduced inner portion 23. Therefore, the eye-like members may be attached to the body with a snap-in action.

I claim:

1. A fishing lure having a tubular body portion at the forward end thereof, rotatable beads simulating eyes in said body portion, an upwardly convex substantially flat rear portion formed by said body, horizontally disposed side fins the front and rear end of said body, a substantially flat tail portion extending horizontally from the sides of the rear of said body forming a tail with a pair of pointed ends which are adapted to support hook means.

2. A fishing lure having an arcuate one-piece body portion, said body portion having a tubular opening at the frontal extremity thereof, outwardly and upwardly extending opposed stabilizing members formed intermediate the ends of said fishing lure, transversely disposed tail members formed at the rear-most end of said body portion below the plane of said stabilizing members, and hook means attachable to said tail members.

3. A fishing lure having a unitary convex body portion, said body portion having a circular opening at the front end thereof to permit the passage of water therethrough, a pair of transversely disposed fins formed from said body portion at the central upper portion thereof and a pair of transversely disposed after-members positioned below the plane of said transversely disposed fins having hook means attachable thereto.

4. A fishing lure formed of tubular material comprising a unitary tubular body member, the top portion of said tubular body member having been formed outwardly to provide hydrostatic stabilizing elements medially between the ends thereof and at the after end thereof, hook means attached to said stabilizing elements, there being a circular opening formed at the front of said tubular body member, said body member having a fishing line attachment opening formed therein, the front circular opening permitting the passage of water therethrough to create turbulent pulling of the fishing lure so as to cause the lure to be agitated when pulled through the water, and beaded eye means insertable into openings in the front most portion of said lure to create additional turbulent conditions as the fishing lure is pulled through the water.

5. An artificial bait having a tubular body member with a line attachment opening therein at the front thereof, said body member being upwardly convex throughout its length and comprising an open tubular conduit at the front thereof, opposed integral stabilizing planes positioned intermediate the ends and slightly above the transverse center line of said body member, said stabilizing planes being inclined angularly outward and upward, outwardly extending horizontally opposed rear planes positioned at the rear and slightly below the transverse center line of said body member, mutiple hook means attached to each of said rear planes, and beaded eye members rotatably retained in said tubular conduit.

6. A fishing lure arched upwardly along its longitudinal center line comprising an elongated unitary body, an open-end tubular conduit formed at the front thereof through which water will pass as the lure is drawn through the water, integral outwardly extending plane members on each side of said body member intermediate the ends thereof above a transverse center line, said plane members limiting the rotational movement of said lure as it passes through the water, outwardly extending substantially horizontal rear planes formed on each side of said body member at the rear thereof below a transverse center line, multiple hook means attached to the rearmost extremity of said rear planes, and a pair of angularly displaced light reflective members attached to said tubular conduit.

7. A fishing lure upwardly convex along its longitudinal axis comprising, a one-piece body member having a tubular opening at the forward end thereof, a pair of rotatable eye-like members supported in either side of said body member, horizontally disposed side fins centrally positioned on each side of said body member, bifurcated horizontally disposed tail portions positioned at the rear of said body member, and multiple hook means attached to each part of said tail portion, the said tubular opening cooperating with said side fins and said tail portions to create turbulance as the lure is pulled through the water thereby causing said lure to reciprocate from side to side whereby the multiple hooks will be disguised.

8. A fishing lure comprising a unitary body portion, said body portion being formed to present a hollow tubular forward end, the rearward section of said body portion opening transversely outward to provide substantially horizontal upper edges, rotatable means simulating eyes affixed to said body portion, opposed substantially horizontally disposed side fins extending along the upper horizontal edge of said body portion and bifurcated tail fins adapted to support spaced apart hook means from the extreme ends of said tail fins.

References Cited in the file of this patent
UNITED STATES PATENTS

| | | |
|---|---|---|
| D. 152,657 | Simon | Feb. 8, 1949 |
| 1,611,644 | Johnson | Dec. 21, 1926 |
| 1,847,397 | Hofschneider | Mar. 1, 1932 |
| 2,038,127 | Pflueger | Apr. 21, 1936 |
| 2,192,563 | Starkey | Mar. 5, 1940 |
| 2,333,590 | Schueller | Nov. 2, 1943 |
| 2,659,995 | Hagstrom | Nov. 24, 1953 |
| 2,691,841 | Daniel | Oct. 19, 1954 |
| 2,797,518 | Anderson | July 2, 1957 |